(12) United States Patent
Anno

(10) Patent No.: US 7,957,022 B2
(45) Date of Patent: Jun. 7, 2011

(54) INFORMATION PROCESSING APPARATUS ALLOWING PLURALITY OF USERS TO CONCURRENTLY LOG IN, AND METHOD OF CONTROLLING THE SAME

(75) Inventor: Makoto Anno, Minato-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1099 days.

(21) Appl. No.: 11/462,297

(22) Filed: Aug. 3, 2006

(65) Prior Publication Data

US 2007/0052993 A1  Mar. 8, 2007

(30) Foreign Application Priority Data

Sep. 5, 2005  (JP) .................. 2005-256858

(51) Int. Cl.
G06F 3/12 (2006.01)
G06K 15/00 (2006.01)
H04N 7/14 (2006.01)
G06F 9/455 (2006.01)

(52) U.S. Cl. ............... 358/1.15; 358/1.18; 358/1.13; 348/14.08; 718/107

(58) Field of Classification Search ......... 358/1.1–1.18; 434/20; 709/223; 705/37, 26; 713/183, 713/202; 348/14.08; 718/107
See application file for complete search history.

(56) References Cited

U.S. PATENT DOCUMENTS

| 6,081,789 | A  | * | 6/2000 | Purcell ............................ 705/37 |
| 6,601,043 | B1 | * | 7/2003 | Purcell ............................ 705/26 |
| 6,677,976 | B2 | * | 1/2004 | Parker et al. ............... 348/14.08 |
| 7,231,436 | B1 | * | 6/2007 | Dalfo et al. ................... 709/223 |
| 7,421,697 | B2 | * | 9/2008 | Takahashi et al. ............ 718/107 |
| 7,603,564 | B2 | * | 10/2009 | Adachi ........................ 713/183 |
| 2003/0163740 | A1 | * | 8/2003 | Thjai et al. .................... 713/202 |
| 2004/0168092 | A1 | * | 8/2004 | Adachi ........................ 713/202 |
| 2005/0003330 | A1 | * | 1/2005 | Asgarinejad et al. ........... 434/20 |
| 2005/0050210 | A1 | * | 3/2005 | Kennedy ....................... 709/229 |
| 2006/0077431 | A1 | * | 4/2006 | Zhang et al. ................. 358/1.15 |
| 2006/0174308 | A1 | * | 8/2006 | Fuller et al. ................... 725/133 |

FOREIGN PATENT DOCUMENTS

JP 2004-110549 A 4/2004

* cited by examiner

Primary Examiner — James A Thompson
Assistant Examiner — Satwant K Singh
(74) Attorney, Agent, or Firm — Canon USA Inc. IP Division

(57) ABSTRACT

An information processing apparatus capable of displaying a predetermined object, such as a file, is configured to allow a plurality of users to access the object. First, a plurality of users are set to a logged-in status. While the plurality of users are set to the logged-in status, one user in the logged-in status and having no access right to an object is permitted to operate the object using an access right of another user in the logged-in status.

8 Claims, 8 Drawing Sheets

INFORMATION PROCESSING APPARATUS ALLOWING PLURALITY OF USERS TO CONCURRENTLY LOG IN, AND METHOD OF CONTROLLING THE SAME

BACKGROUND OF THE INVENTION

1. Field of the Invention

The present invention relates to a control technique for permitting users to log into an information processing apparatus and to operate the apparatus in an environment corresponding to the users.

2. Description of the Related Art

In recent years, as information security has become a matter of great concern, many terminals adopt a technique for controlling accesses to various information, such as a file, a folder, etc.

It is obviously important to control accesses to various information processing apparatuses such as MFPs (Multifunction Peripherals), since various functions (conventional basic functions, such as copying, scanning, printing, storing and displaying documents) are added to the MFPs.

The recent MFPs include a function that permits a user to log in upon individual authentication before operating the MFP. In this case, the individual authentication is accomplished by controlling a card reader to read information of each individual's ID card. If the authentication is successful, the user is provided with an access right for an operation using the MFP. That is, using the MFP, the user can access various objects, such as a file, folder and the like, and further can read, edit and send the objects, only using the provided access right. Such objects are provided inside the MFP or on a network connected to the MFP.

In this regard, recent MFPs have the same system as log-in control and access control for personal computers. Japanese Patent Application Laid-Open No. 2004-110549 discusses a control technique for logging into or accessing a personal computer.

As described above, the MFP can scan, print, store and display a document. Thus, it is required that the MFP be a tool used for executing business matters without using a personal computer.

For example, the MFP can be installed in a place, such as a meeting room or a consulting room where people get together, thereby serving as a tool for the meeting or consultation. The MFP can freely retrieve a document or data therefrom, display the retrieved data so as to show it to participants of the meeting, store a result of the examination done by the participants based on the displayed data, and distribute the stored information to each participant.

However, like a personal computer, if one user logs into the conventional MFP, another user cannot log in until the one user logs out. Thus, if one user logs in, the user can simply access a file or folder on a network or inside the MFP, only within the range of the user's access right.

Even if the MFP is intended to be used as described above, any user other than the one logged in user cannot freely access a file or folder not within the range of the other user's access right. In this case, all participants cannot store a file in the MFP, examine the stored file, and store the examined file in the individuals' holders. That is, the conventional MFP cannot sufficiently serve as a tool for carrying out the business tasks. Therefore, it is expected that there will be provided an access control technique for accessing an object and for realizing the above utilization.

The same problem occurs for an MFP and for a personal computer, etc., operating the above processing.

SUMMARY OF THE INVENTION

An exemplary feature of the present invention is to provide an information processing apparatus capable of overcoming or at least mitigating the above problem and a method of controlling the same.

Another exemplary feature of the present invention is to provide an information processing apparatus capable of being operated concurrently by a plurality of users and a method of controlling the same.

Still another exemplary feature of the present invention is to provide an information processing apparatus into which a plurality of users can concurrently log, and in which one user can operate an object to which another user has an access right, and a method of controlling the same.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4 and 5 are schematic diagrams each showing an example of a display screen at the time of logging in.

FIGS. 6 and 7 are schematic diagrams each showing an example of a display screen customized for each user, after having logged in.

DETAILED DESCRIPTION OF THE EMBODIMENTS

Exemplary embodiments of the invention will be described in detail below with reference to the drawings.

First Embodiment

Figure 1:
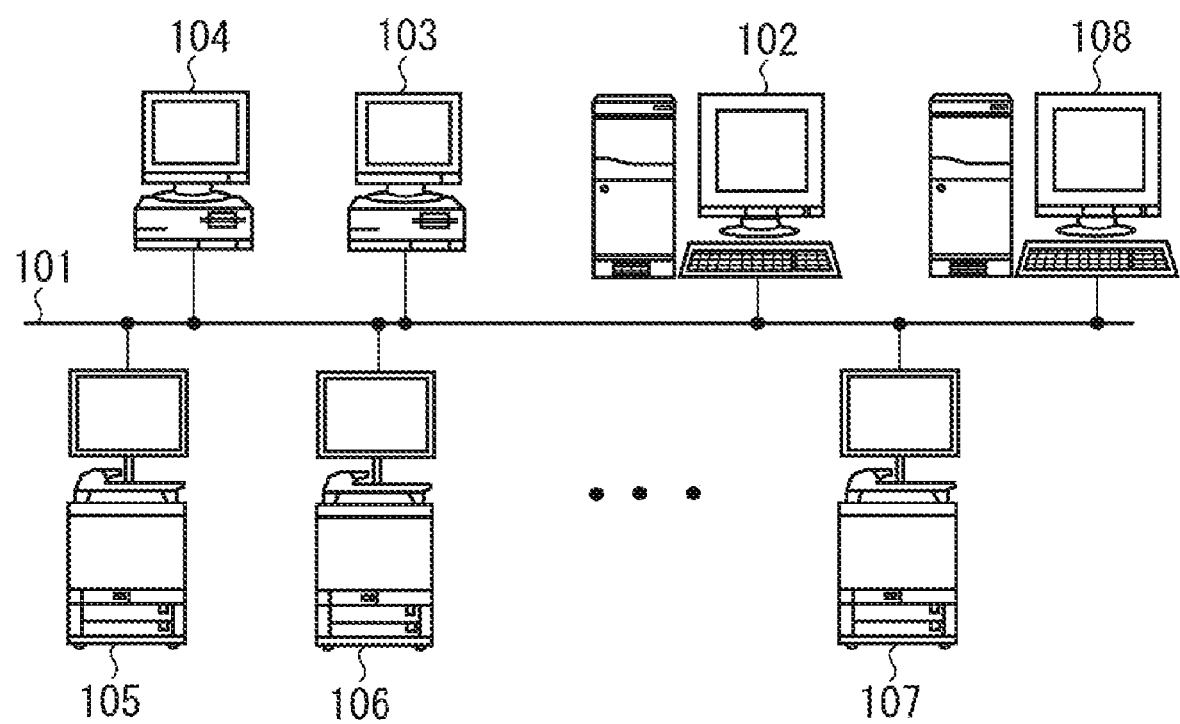
FIG. 1 is a diagram exemplarily showing a configuration of a network system including an MFP according to a first embodiment of the present invention.

FIG. 1 is a diagram showing a configuration of a network system to which an MFP according to a first embodiment of the present invention is connected.

In FIG. 1, reference numerals 105 to 107 denote MFPs, while reference numeral 102 denotes a file server. In addition, reference numeral 108 denotes an authentication server, while reference numerals 103 and 104 denote client PCs. The MFPs 105 to 107, the file server 102, the authentication server 108, and the client PCs 103 and 104 are connected with one another through a network 101 for data communications therebetween.

Hardware Configuration of MFP

Figure 3:
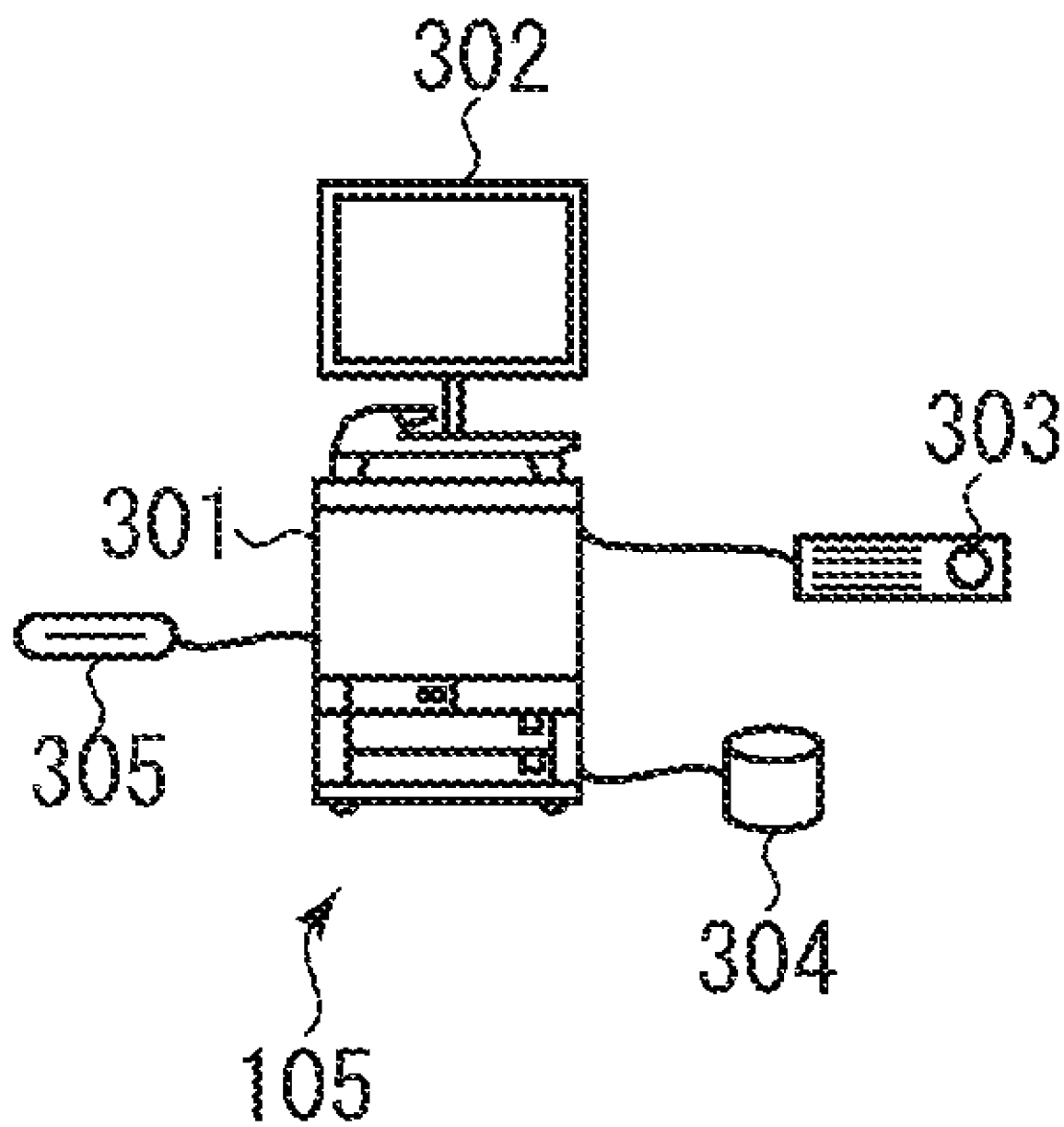
FIG. 3 is a schematic diagram showing a hardware configuration of the MFP.

In FIG. 3, reference numeral 301 denotes a main body having control functions for printing, scanning, etc., while reference numeral 302 denotes a display device for displaying both operational inputs and the input results on the same display screen, such as for example a touch panel. Reference numeral 304 denotes a data storage device which stores data in the MFP, while reference numeral 305 denotes a card reader device which reads data content recorded on an ID card for individual authentication. In consideration of the small display screen of the display device 302, an external projector 303 can be connected to the main body 301. The projector 303 may be an external type projector, or a system corresponding to the projector 303 may be built in the MFP 105.

The configuration of the MFP 105 is not particularly limited to the above. For example, the display device 302 may be a display-only device that does not have an operational input system, and the data storage device 304 may be contained in the main body 301. Further, in place of the card reader device 305, there may be provided a device adopting an individual authentication method, for example, through key inputs, fingerprint authentication, or iris recognition.

A process executed by the MFP 105 when the MFP 105 is installed in a meeting room and used for a meeting of a plurality of participants will now be described.

Prior to using the MFP 105, a first participant (user A) swipes his/her personal ID card through the card reader device 305, inputs a password as needed, and goes through for individual authentication, thereby logging into the MFP 105.

Subsequently, a next participant (user B) swipes his/her personal ID card through the card reader device 305 in order to use the MFP 105.

In a conventional MFP, at this time, because the user A has already logged therein, a log-in display screen is not displayed, or a log-in request is denied on a log-in display screen.

On the contrary, the MFP 105 according to the present exemplary embodiment displays the log-in display screen for the user B. Then, the user B inputs a password as needed, and goes through for individual authentication, thereby successfully logging in the MFP 105. Further, the MFP 105 displays a log-in display screen for a predetermined number of persons to log into the MFP in accordance with the number of participants in the meeting.

That is, the MFP 105 has such a configuration that a plurality of participants can concurrently log in.

Functional Configuration of MFP

Figure 2:
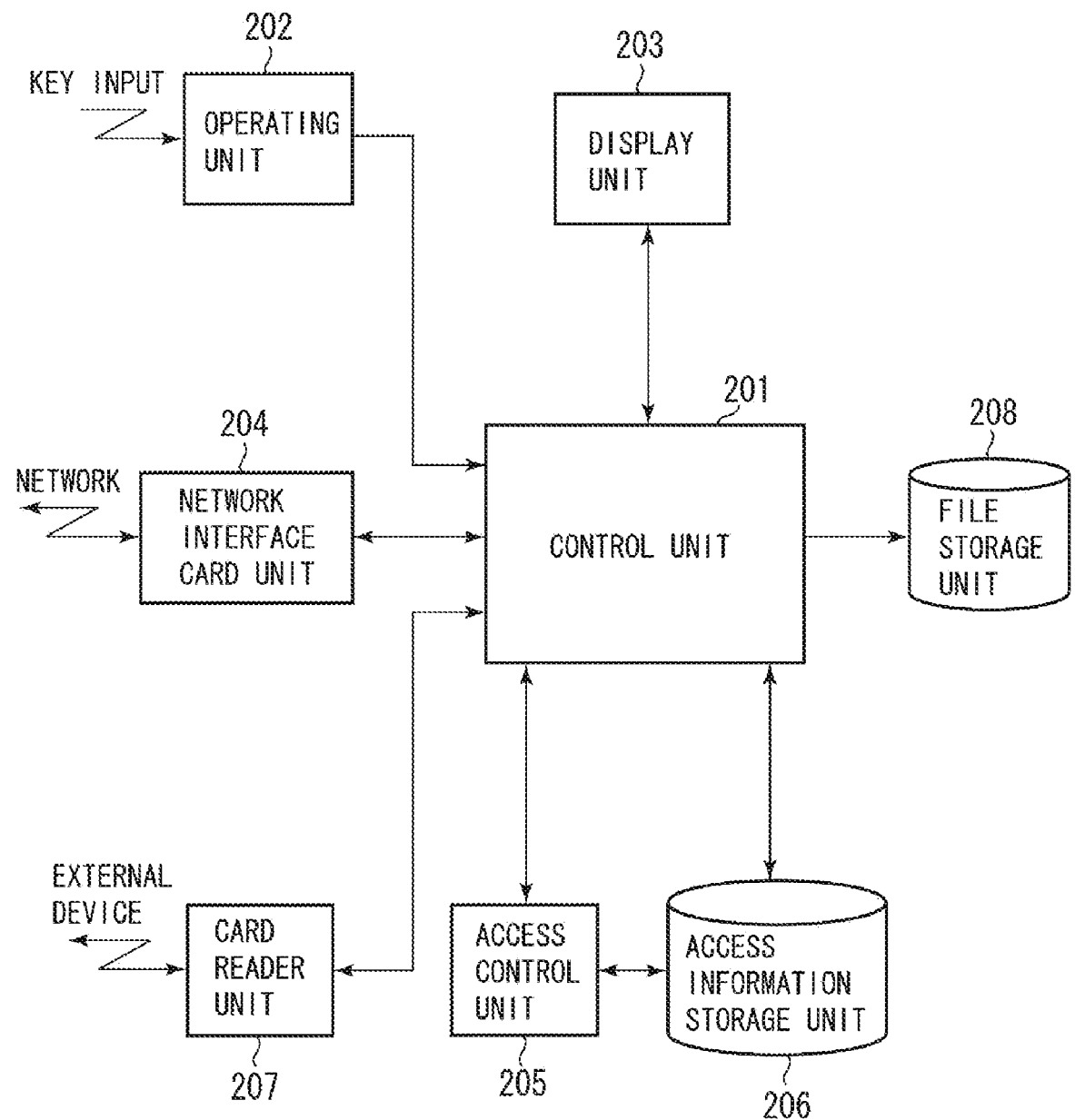
FIG. 2 is a block diagram showing a functional configuration of the MFP.

The above-described logging function of the MFP 105 will now be described with reference to FIG. 2. FIG. 2 is a diagram showing a functional configuration of the MFP 105.

A control unit 201 controls all functions of the MFP 105. As one of the functions, the control unit 201 controls the logging-in for the MFP 105, and controls various processing on a real-time operating system (OS).

A user performs a log-in operation through a card reader unit 207. If a card is inserted, the control unit 201 controls the card reader unit 207 to read the personal ID, and controls a display unit 203 to display a display screen prompting the user to input a PIN (Personal Identification Number) code for reading internal data of the card as needed.

Upon acceptance of the PIN input from an operating unit 202, the control unit 201 reads out the internal data of the card, and executes individual authentication. If the individual authentication is accomplished, an access control list for the user is acquired. The method for acquiring the access control list depends on the configuration of the authentication system. An example of one acquiring method will now be described.

The control unit 201 accesses the authentication server 108 on the network 101 through an NIC (Network Interface Card) unit 204, and acquires the access control list for the user. The control unit 201 stores the acquired access control list in an access information storage unit 206 in cooperation with an access control unit 205.

The MFP 105 accesses a file storage unit 208 mounted therein or the file server 102 to read and write files managed and stored therein. Such files are accessed in accordance with a range of access right that is determined based on the access control list for the user registered in the authentication server 108. These operations are implemented using a generally known technique of individual authentication and access control.

As described above, the individual authentication method can be realized through one or more of: password input, fingerprint authentication, iris recognition and ID card. The authentication processes may differ depending on the individual authentication method, but the essential quality of the access control is similar.

User Log-In

The user interface at the time of logging in will now be described, with reference to FIGS. 4 and 5.

Figure 4:
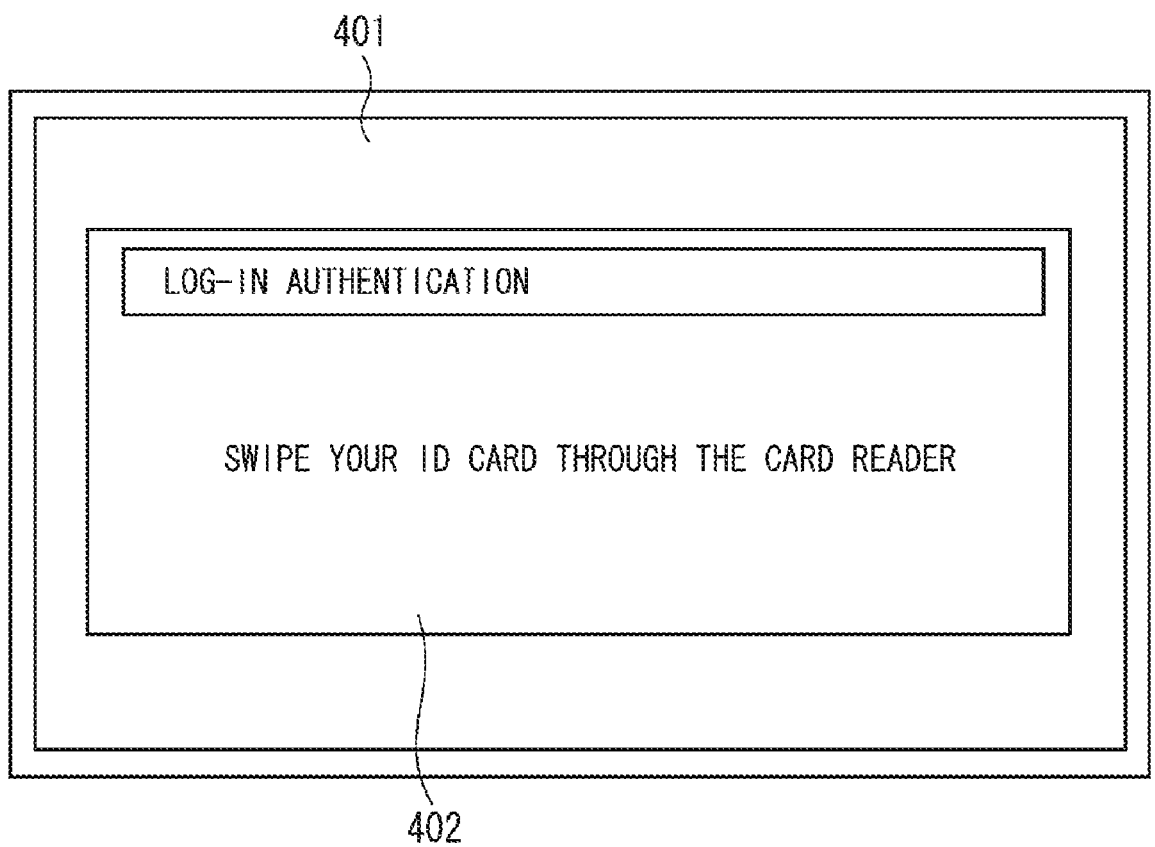
Figure 5:
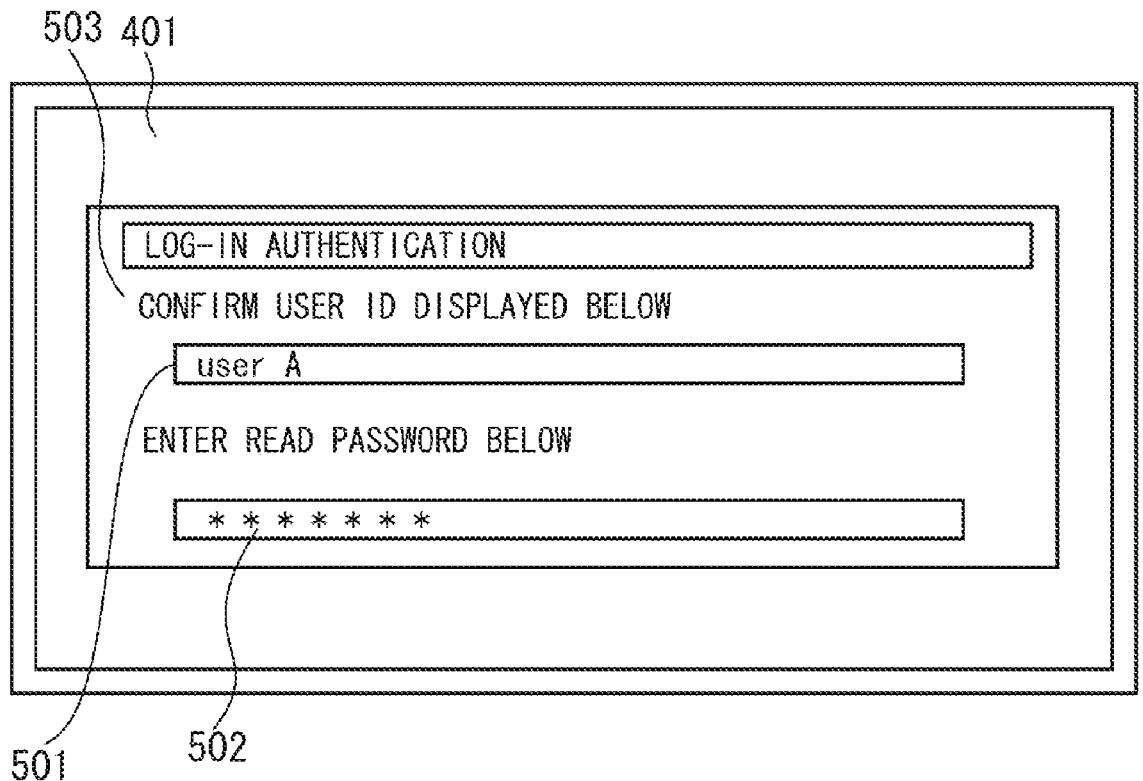

FIGS. 4 and 5 each show an example of a display screen that appears on the display unit (in a touch panel system with an input function) 203 of the MFP 105. FIG. 4 shows a display screen when no one user logs in. At the time of logging in, a display screen 401 displays a display window 402 prompting the user to swipe the ID card through the card reader unit 207. Needless to say, if a non-contact type authentication method or iris recognition is adopted, different instructions should be provided to the user depending on the authentication method.

If the user swipes the ID card through the card reader unit 207, the display screen 401 is displayed as shown in FIG. 5. In this example, because the user name of the ID card is displayed in a display field 501, the user can confirm his/her user name. The display screen 401 prompts the user to input a PIN code (a password) for reading the authentication information of the ID card, and accepts the input in a display field 502. In this manner, the user successfully logs into the MFP 105.

User's Work Area

Figure 6:
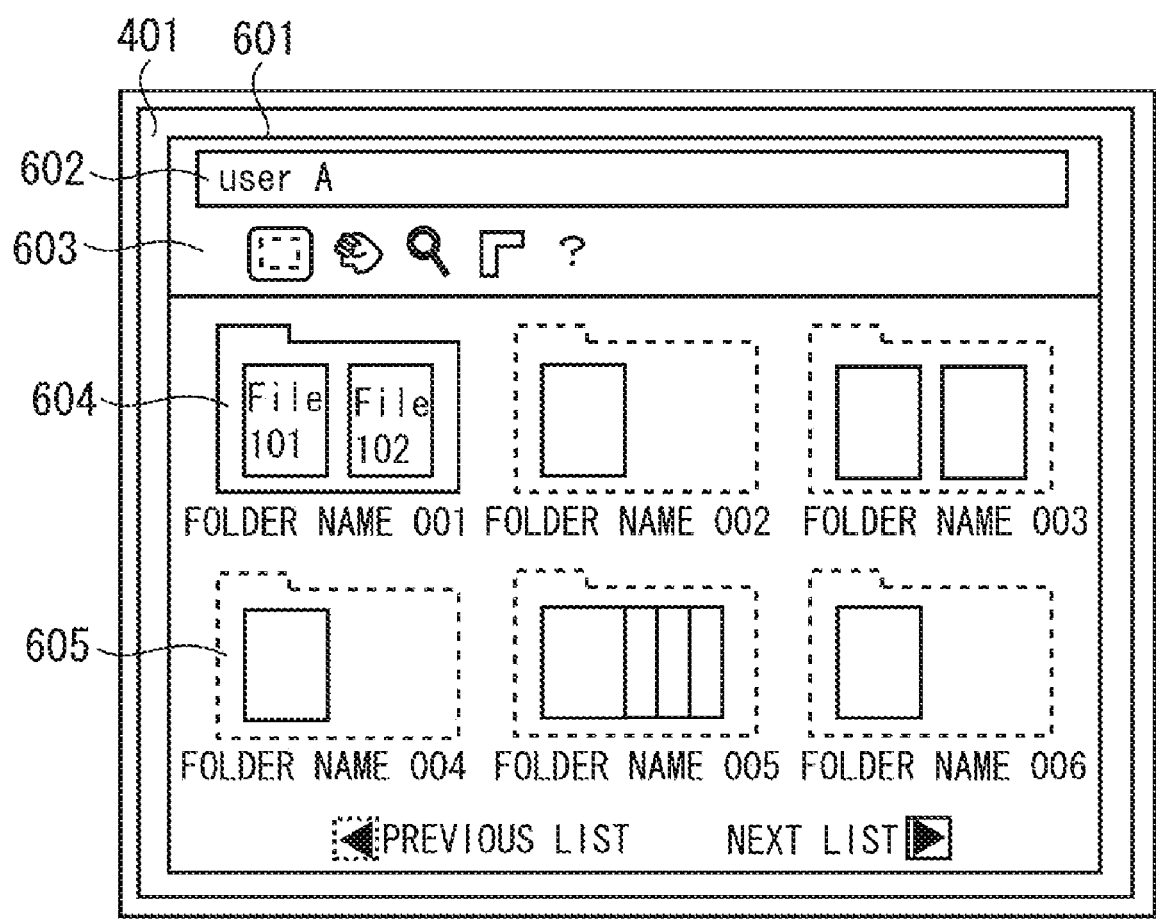

Upon completion of user log-in, the display unit 203 displays a work area 601 customized for each user as shown in FIG. 6. The work area 601 is composed of a plurality of parts. In particular, the work area 601 includes a part 602 displaying a user name, tools (command icons) 603 that can be used by the user, and an object display area 604 displaying any folders or files to which the user has the access right.

The object display area 604 displays folders and files and their corresponding names in association with each other. Thus, the folders and files can easily be identified and selected. The object display area 604 is displayed with a solid line as a folder to which the user has the access right to both write and read. On the contrary, an object display area 605 is displayed with a broken line as a folder to which the user has the access right to read only. Hence, the status of the access right can easily be understood at a glance. Note that the customized work area 601 is displayed in a generally known manner.

Because the work area 601 is thus displayed, the user can easily find out a target file, can have a presentation using the file, and can write some ideas in the file, during a meeting. In this case, to input the above file, a paper document can be read out using a scanner of the MFP 105, or a file can be read out from a terminal on the network 201 through the NIC unit 204. On the other hand, to output a file, it can be printed on a paper using a printer of the MFP 105, or can be sent to a terminal on the network 101 through the NIC unit 204.

Log-In of Plurality of Users

A user interface used in a case where, when one or more users have already logged in, another user tries to log in, will now be described. As for the already-logged-in user, the associated work area 601 shown in FIG. 6 is already displayed on the display unit 203. At this time, if the other user swipes the ID card through the card reader unit 207, the display screen shown in FIG. 5 is displayed again. This user tries to log in using the above-described method. With such a user interface, ID cards of a plurality of users can be authenticated for implementing the user log-in. Thus, a plurality of users can operate the MFP 105 in cooperation while viewing a common display screen in the common environment (on the common OS).

The operation of the MFP 105 at this time will now be described with reference to FIG. 2. If the second or subsequent user logs in, the MFP 105 accesses the authentication server 108 on the network 101 through the NIC (Network Interface Card) unit 204, and acquires an access control list for the user, just like the case of the first user.

The control unit 201 stores the acquired access control list in the access information storage unit 206 in cooperation with the access control unit 205. At this time, access control lists for a plurality of users are stored in the access information storage unit 206. Because the access control lists for the users can be identified according to user IDs, the lists can be stored without being mixed up.

Work Area for Plurality of Users

Figure 7:
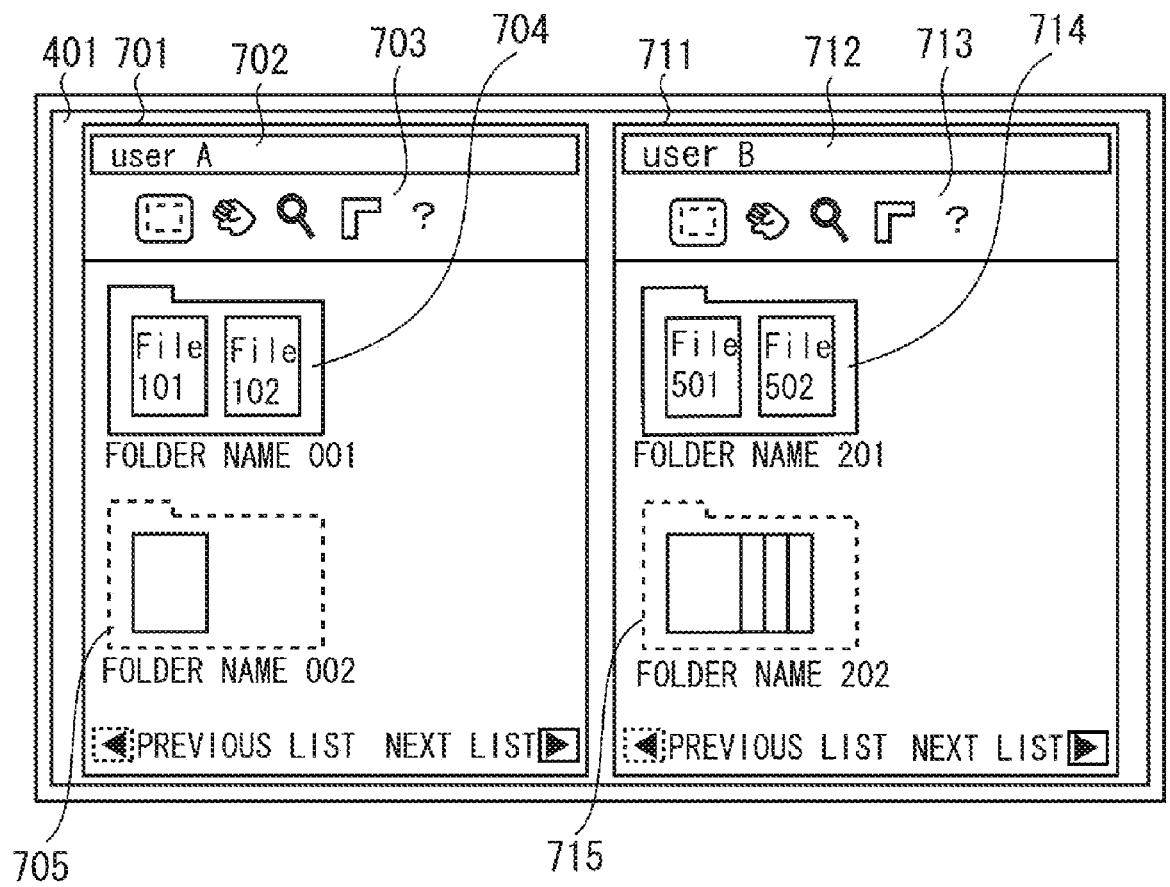

Upon completion of log-in of a plurality of users, work areas 701 and 711 customized for each user are displayed as shown in FIG. 7. Because user names are displayed in parts 702 and 712 of the respective work areas 701 and 711, the work areas 701 and 711 can easily be identified in association with the user names.

In the example of the display screen show in FIG. 7, the work areas 701 and 711 for the different users are designed the same (refer to parts 702 to 705, and parts 712 to 715). However, the work areas can be customized in different designs. Therefore, it is easy to understand which work area corresponds to which user, based on the design of the work areas.

In this manner, the MFP 105 according to the present embodiment can display a plurality of work areas when a plurality of users log in. In the example of the display screen shown in FIG. 7, only two work areas are displayed. However, more than two work areas can be displayed by some changes in the user interface, for example, by scrolling or turning the pages. A plurality of display devices may be provided, as long as they are operable under the same OS and can display information representing the access rights.

Access Control When a Plurality of Users Log In

An access control method when a plurality of users log in will now be described, after description is made to an access control method when one user logs in, with reference to FIG. 2. In the following description, it is assumed that each user operates the MFP 105 using the operating unit 202. However, a plurality of operating units may be provided, and a plurality of users may operate the MFP 105 using different operating units.

The user, having logged in, can point to an icon on the display screen 401 shown in FIG. 7 so as to open a target file, thereby displaying the file on the display device 302. For example, when the user opens a file "File 101" in a folder 704 for "user A", the user points to an icon "File 101" in the work area 701 and instructs the MFP 105 to "open the file".

At this time, the MFP 105 carries out the following processing. The operating unit 202 detects that the work area 701 is pointed to when the instruction of "open the file" is given.

The control unit 201 acquires an access control list for the "user A" of the work area 701 from the access information storage unit 206 via the access control unit 205, and accesses the file "File 101" using the acquired list. At this time, if the file "File 101" exists in the file server 102 on the network 101, the file is accessed through the NIC unit 204. On the contrary, if the file exists in the file storage unit 208 of the MFP 105, the file is directly accessed.

When opening a file "File 501" in a folder 714 for the "user B", the user points an icon "File 501" in the work area 711 and instructs the MFP 105 to "open the file".

At this time, in the MFP 105, the operating unit 202 detects that the work area 711 is pointed to. The control unit 201 acquires an access control list for the "user B" of the work area 711 from the access information storage unit 206 via the access control unit 205, and accesses the file "File 501" using the acquired list.

At this time, if the file "File 501" exists in the file server 102 on the network 101, the file is accessed through the NIC unit 204. If the file exists in the file storage unit 208 of the MFP 105, the file is accessed directly.

As described above, a target file is accessed using an access control list for the user (having logged in) corresponding to the pointed work area. That is, while a plurality of user shave concurrently logged in (e.g., a plurality of users are concurrently set to a logged-in status), one user is permitted to access an object (though the one user has no access right to the object) to which another user has the access right. When the user having the access right logs out, this object is prohibited from being accessed. Needless to say, this method can be applied not only for accessing a file, but also for accessing any other kind of access-controlled object based on an access control list.

Processing Flow in MFP

Figure 8:
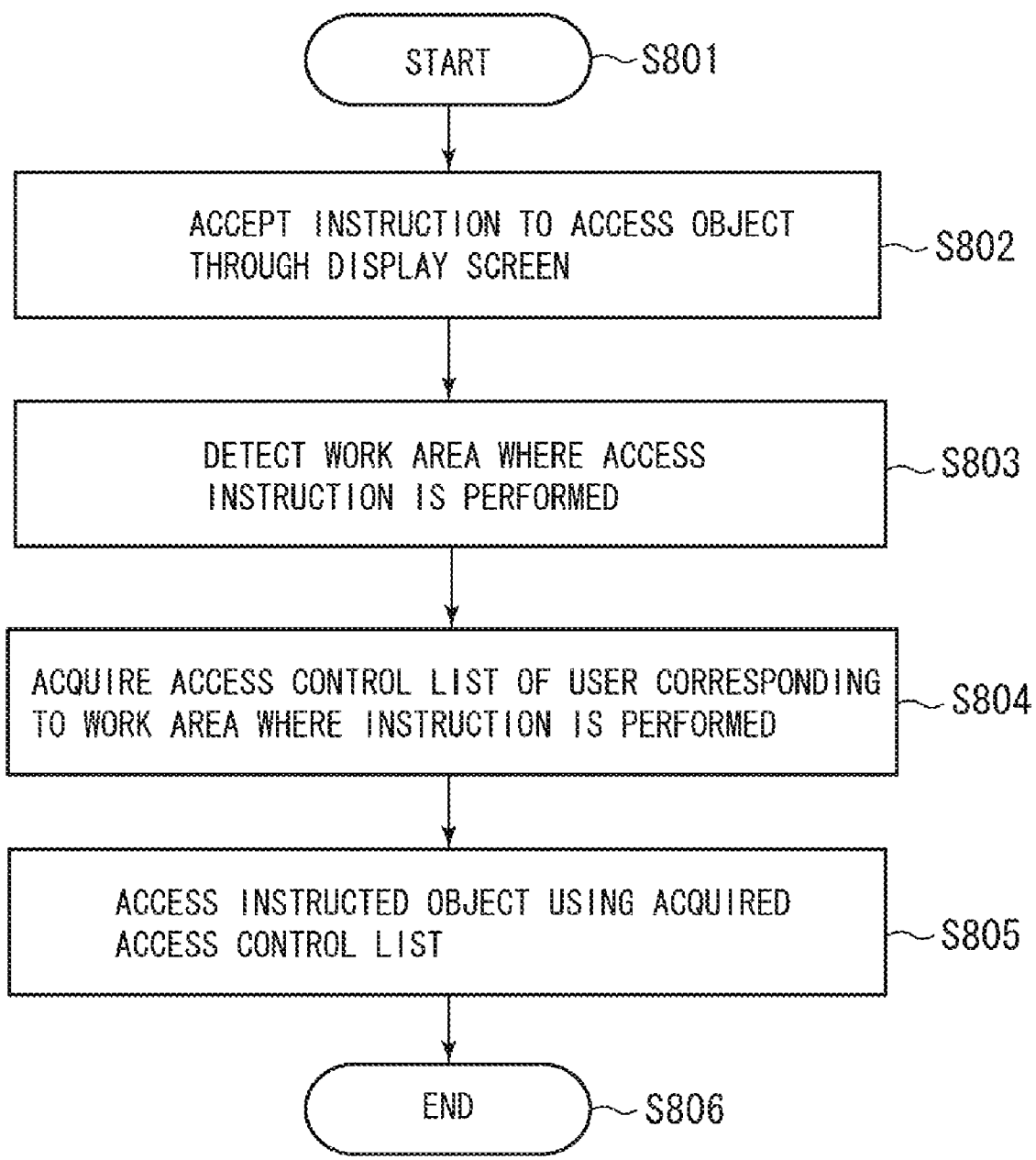
FIG. 8 is a flowchart showing the flow of access control in the MFP according to the first embodiment of the present invention.

The above-described processing will now be described using the flowchart of FIG. 8.

In a state (step S801) where a plurality of users have logged in, an instruction to access a predetermined object is accepted via the operating unit 202 (step S802). Then, the control unit 201 detects a work area where the access instruction is performed (step S803). Once the work area is specified, a user corresponding to the work area can be specified. Hence, an access control list for the user corresponding to the specified work area where the access instruction is performed is acquired (step S804). The control unit 201 accesses the instructed object using the acquired access control list (step S805).

In this manner, in response to the access instruction performed via the operating unit 202, a target object can be accessed in the range of the corresponding use's access right, using the access control list for the user of the work area.

Example of Effective Use of MFP When Plurality of Users Have Logged In

Description will be made to an example of effective use of the MFP 105. For example, even if the "user A" intends to copy the user's file "File 101" into the folder 714 of the "user B's" work area 711, any user (having no access right to write) other than the "user B" cannot write anything into the folder 714.

Even if the file is intended to be copied using the access control list for the "user A" (i.e. writing to the file is intended), the file cannot be copied due to lack of an access right. However, if the file is intended to be copied using the access control list for the "user B", the file can be copied due to the access right.

The file can be copied as follows. When the file "File 101" is read out from the work area 701, the access control list for the "user A" is used. When the file "File 101" is written into the folder 714 in the work area 711, the access control list for the "user B" is used. Now, the file "File 101" can be copied. In this manner, the MFP 105 determines which work area is accessed by the user who has sent the instruction for copying the file, instead of determining whether the user having sent the instruction is the "user A" or "user B".

For example, suppose that a new file is created by merging both files "File 101" and "File 501" which are respectively opened by the "user A" and "user B". Further suppose that the newly created file is then stored in both users folders.

When the newly created file is stored (written) in the folder 704 of the work area 701 of the "user A", the access control list for the "user A" is used. When the newly created file is stored (written) in the folder 714 of the work area 711 of the "user B", the access control list for the "user B" is used. In this case as well, an arbitrary user can send an instruction to do so, because the user accesses the file within the range of the access right using the access control list for the user corresponding to his/her own work area.

In addition, for example, suppose that the "user A" sends his/her file "File 101" to an e-mail address registered in an address book that can be accessed only by the "user B". With the access control list for the "user A", the "user A" first selects the file "File 101". With the access control list for the "user B", the "user A" then opens the address book of the "user B" that is included, for example, in a command icon 713, selects the e-mail address, and sends the file thereto. Also in this case, the operation is carried out using the access control lists corresponding to the respective work areas. Accordingly, the instruction can be made within the range of the access right for the other user.

As will be understood from the above description, according to the present embodiment, a plurality of users can concurrently log into a single MFP. At this time, the work areas for the users are displayed on the MFP, and objects can freely be accessed still under the protection of the access rights between the work areas. As a result, the meeting can go on efficiently and effectively.

Second Embodiment

In the above-described first embodiment, the processing in a single MFP has been discussed. However, the same process can be applied to the case where a plurality of MFPs are connected to a network. In this case, the control unit 201 of each of the plurality of MFPs can perform communications with another MFP through the NIC unit 204. The control unit 201 of each of the MFPs exchanges the access control list regarding an object in the MFP corresponding to the user having logged in, with each other, thus controlling the processing as if a single MFP seamlessly carries out the operation. In addition, a plurality of users for a plurality of MFPs can log into a resource (e.g., a file server, etc.) that can be accessed through the network, thus collaborating with each other. In such cases, as described above, the same display screen is displayed on the MFPs operated by the users, and the user names of the users concurrently having logged in are also displayed. Such methods are generally known and, thus, will not be specifically described here.

When a plurality of MFPs operate in a manner as if one single MFP seamlessly carries out the operation, a file can physically be copied from an operational display screen of one MFP to an operational display screen of another MFP. That is, a plurality of users can copy, store, and send files using a plurality of logged-in MFPs.

As described above, using one or more MFPs, a plurality of users can concurrently log in and can operate objects while viewing a common display screen in the common environment.

In the above-described embodiments, MFPs are described by way of example. However, the present invention is not limited to the case of MFPs, and may be applied to any kind of system, such as a general personal computer, etc., as long as the system gives the access right for each user in the logging-in process.

As described above, in an information processing apparatus which controls the access to various objects in accordance with individual authentication, security on the objects can be maintained while improving the object efficiency.

Other Embodiments

The present invention can be applied not only to a system including a plurality of devices (e.g., a host computer, an interface device, a reader, a printer, etc.), but also to a system comprising a single device (e.g., a copying machine, a facsimile machine, etc.).

The present invention can be accomplished by a computer (CPU or MPU, etc.) of a system or device, upon execution of program code of a software program for realizing the functions of the above-described embodiments. Before being read by the computer, the program code is supplied and stored on a storage medium.

In this case, the program code read out from the storage medium realizes the functions of the above-described embodiments, and thus the storage medium recording the program code stored thereon is included in the present invention.

Such a storage medium for supplying the program code include, for example, a flexible disk, a hard disk, an optical disk, a magneto-optical disk, a CD-ROM, a CD-R, a magnetic tape, a non-volatile memory card, a ROM, etc.

Upon execution of the program code read out by the computer, the above-described embodiments are realized. In addition, in response to an instruction of the program code, an OS (Operating System) operating in the computer executes the actual processing partially or entirely, thereby realizing the above-described embodiments. Such a function is included in the present invention.

Further, after the program code read out from the storage medium is written in a memory included in a function extension board inserted into the computer or a function extension unit connected to the computer, a CPU or the like included in the function extension board or function extension unit partially or entirely executes the actual processing in response to an instruction of the program code. As a result of the actual processing, the functions of the above-described embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-256858 filed Sep. 5, 2005, which is hereby incorporated by reference herein in its entirety.

What is claimed is:

1. An information processing apparatus comprising:
an accept unit, which accepts a plurality of log-in requests from a plurality of users including a first user and a second user;
a setting unit, which sets both the first user and the second user concurrently to a logged-in status in a case where each of the users is authenticated;

a display control unit, which controls a display device such that an object accessible to a given user is displayed on an operation screen of the display device, wherein a first display area in which an object accessible to the first user is displayed and a second display area in which an object accessible to the second user is displayed are concurrently displayed on the operation screen;

a detecting unit that detects a display area on which a user instruction is performed; and an access unit that accesses the object by using access control information of the first if the display area detected by the detecting unit is the first display area, and accesses the object by using access control information of the second user if the display area detected by the detecting unit is the second display area.

2. The apparatus according to claim 1, further comprising a hold unit which holds the access control information indicating correspondence between an object to which each of the users is accessible and an indication for specifying the user.

3. The apparatus according to claim 1, further comprising a storage unit which stores a plurality objects, wherein said access unit accesses the object stored in said storage unit.

4. The apparatus according to claim 1, further comprising a connect unit which connects said information processing apparatus to a network, wherein said access unit accesses the object stored in a device connected to the network via said connect unit.

5. The apparatus according to claim 1, further comprising a scanner which scans image of the document, wherein the object is the scanned image obtained by said scanner.

6. The apparatus according to claim 1, further comprising a printer which prints image corresponding to the object to a recording sheet.

7. A controlling method of an information processing apparatus comprising the steps of:

accepting a plurality of log-in requests from a plurality of users including a first user and a second user;

concurrently setting both the first user to a logged-in status in a case where each of the users is authenticated;

controlling a display device such that an object accessible to a given user is displayed on an operation screen of the display device, wherein a first display area in which an object accessible to the first user is displayed and a second display area in which an object accessible to the second user is displayed are concurrently displayed on the operation screen;

detecting a display area on which a user instruction is performed; and accessing the object by using access control information of the first user if the detected display area detected is the first display area, and accessing the object by using access control information of the second user if the detected display area is the second display area.

8. A storage medium which stores a computer readable program for controlling an information processing apparatus, said program comprising the steps of:

accepting a plurality of log-in requests from a plurality of users including a first user and a second user;

concurrently setting both the first user and the second user to a logged-in status in a case where each of the users is authenticated;

controlling a display device such that an object accessible to a given user is displayed on an operation screen of the display device;

wherein a first display area in which an object accessible to the first user is displayed and a second display area in which an object accessible to the second user is displayed are concurrently displayed on the operation screen;

detecting a display area on which a user instruction is performed; and accessing the object by using access control information of the first user if the detected display area is the first display area, and accessing the object by using access control information of the second user if the detected display area is the second display area.

* * * * *